No. 676,281. Patented June 11, 1901.
W. T. SEDDON.
ELECTRODE FOR PRIMARY BATTERIES.
(Application filed Dec. 17, 1900.)
(No Model.)
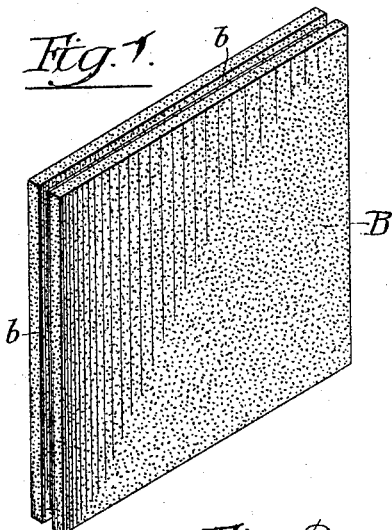
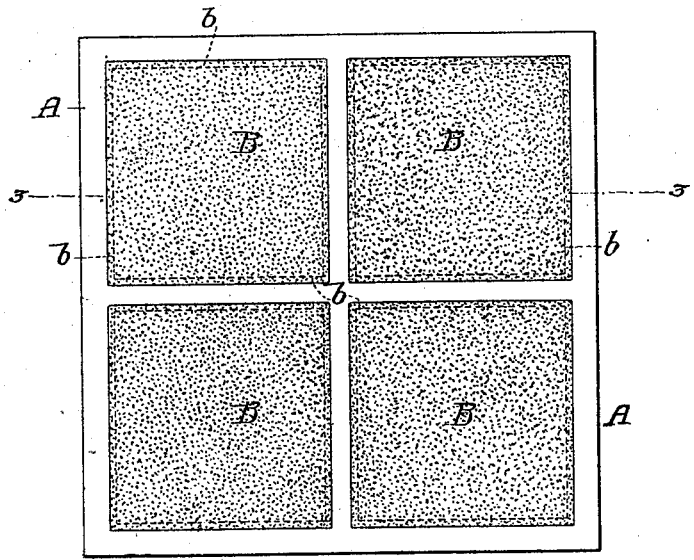
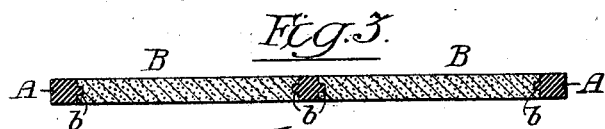
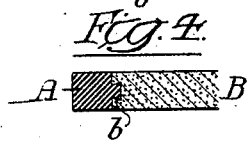
Witnesses:
Hamilton D. Turner
Louis W. Whitehead
Inventor:
William T. Seddon
by his Attorneys:
Howson & Howson

UNITED STATES PATENT OFFICE.

WILLIAM T. SEDDON, OF PHILADELPHIA, PENNSYLVANIA, ASSIGNOR TO HERMAN J. DERCUM, TRUSTEE, OF SAME PLACE.

ELECTRODE FOR PRIMARY BATTERIES.

SPECIFICATION forming part of Letters Patent No. 676,281, dated June 11, 1901.

Application filed December 17, 1900. Serial No. 40,211. (No model.)

*To all whom it may concern:*

Be it known that I, WILLIAM T. SEDDON, a citizen of the United States, residing in Philadelphia, Pennsylvania, have invented a certain Improvement in Electrodes for Primary Batteries, of which the following is a specification.

My invention relates to certain improvements in electrodes for primary batteries in which carbon plates are mounted in metallic frames; and the object of my invention is to securely attach the carbon plates to the frames to prevent leakage.

In the accompanying drawings, Figure 1 is a perspective view of one of the carbon plates detached. Fig. 2 is a front view of an electrode. Fig. 3 is a section on the line 3 3, Fig. 2, and Fig. 4 is a sectional view showing an undercut channel.

A is the frame of the electrode, made of lead or other suitable material, and B represents the carbon plates set into the lead frame. Each of the carbon plates has a channel $b$ extending around its periphery, so that when the plates are set in the mold and the lead frame cast around the plates the lead flows into the channel, forming a tongue which holds the plate rigidly in position and prevents leakage when the electrode is used in a battery.

It has heretofore been difficult to form a tight joint between the frame and the plate, as during the process of building up the battery this lead frame often draws away from the carbon plate. By my invention I secure a tight joint between the two.

The channel may be undercut, as shown in Fig. 4, if desired, and may be formed in many ways without departing from the essential feature of my invention.

I claim as my invention—

1. A battery-electrode consisting of a number of carbon plates, said plates having channels in their peripheries and a frame of cast lead surrounding and supporting said plates, said frame having tongued projections entering the channels in the edge of the plates, substantially as described.

2. The combination in an electrode for batteries, of a lead frame, and one or more carbon plates having an undercut channel in their peripheries into which the lead of the frame extends, substantially as described.

In testimony whereof I have signed my name to this specification in the presence of two subscribing witnesses.

WILLIAM T. SEDDON.

Witnesses:
WILL. A. BARR,
JOS. H. KLEIN.